United States Patent
Volkov

(10) Patent No.: US 12,436,402 B2
(45) Date of Patent: Oct. 7, 2025

(54) RETICLE OVERLAID WITHIN A GALILEAN MAGNIFICATION SYSTEM

(71) Applicant: TruLife Optics Ltd., London (GB)

(72) Inventor: Andrii Volkov, London (GB)

(73) Assignee: TRULIFE OPTICS LTD., London (GB)

( * ) Notice: Subject to any disclaimer, the term of this patent is extended or adjusted under 35 U.S.C. 154(b) by 59 days.

(21) Appl. No.: 17/552,999

(22) Filed: Dec. 16, 2021

(65) Prior Publication Data

US 2022/0282954 A1 Sep. 8, 2022

(30) Foreign Application Priority Data

Dec. 17, 2020 (GB) ..................................... 2020012

(51) Int. Cl.
*G02B 27/34* (2006.01)
*G02B 5/32* (2006.01)
(Continued)

(52) U.S. Cl.
CPC .............. *G02B 27/34* (2013.01); *G02B 5/32* (2013.01); *G02B 9/10* (2013.01); *G02B 25/001* (2013.01); *G03H 1/0402* (2013.01)

(58) Field of Classification Search
CPC . G02B 27/34; G02B 5/32; G02B 9/10; G02B 25/001; G02B 27/32; G03H 1/0402;
(Continued)

(56) References Cited

U.S. PATENT DOCUMENTS

| 399,144 A | * | 3/1889 | Grenfell | F41G 1/345 42/132 |
| 2,382,631 A | | 8/1945 | Harasta | |

(Continued)

FOREIGN PATENT DOCUMENTS

| CN | 207280291 U | | 4/2018 | |
| DE | 1166663 | * | 3/1964 | F41G 1/14 |

(Continued)

OTHER PUBLICATIONS

Jeong et al. "What are the Main Types of Holograms?" https://www.integraf.com/resources/articles/a-main-types-of-holograms (Year: 2015).*

(Continued)

*Primary Examiner* — George G. King
(74) *Attorney, Agent, or Firm* — Ruggiero McAllister & McMahon LLC

(57) ABSTRACT

An optical system is provided, including a Galilean magnification device, including an objective lens and an eyepiece lens arranged along an axis. One of the objective lens and the eyepiece lens is a positive lens and the other is a negative lens, thereby defining an image working distance; a reticle device within the Galilean magnification device, including a holographic element, the reticle device being configured to receive light for illuminating the holographic element from off the axis and to direct light from the holographic element on the axis, so that light from the holographic element is set at the image working distance by the eyepiece lens. There is also described a method for recording a holographic reticle for use in a Galilean magnification device.

7 Claims, 13 Drawing Sheets

(51) Int. Cl.
*G02B 9/10* (2006.01)
*G02B 25/00* (2006.01)
*G03H 1/04* (2006.01)

(58) Field of Classification Search
CPC ...... G03H 1/0005; G03H 1/02; G03H 1/0465; G03H 2001/0473; F41G 1/38; F41G 1/30
USPC .......................................................... 359/428
See application file for complete search history.

(56) References Cited

U.S. PATENT DOCUMENTS

| | | | |
|---|---|---|---|
| 3,024,691 A | 3/1962 | Papke | |
| 5,052,790 A * | 10/1991 | Edwards | G02C 7/088 359/399 |
| 5,283,689 A | 2/1994 | Carlough | |
| 5,349,179 A * | 9/1994 | Morley | G03H 1/22 356/252 |
| 5,784,182 A * | 7/1998 | Francoeur | G03H 1/0005 356/147 |
| 6,490,060 B1 | 12/2002 | Tai et al. | |
| 8,443,541 B2 | 5/2013 | Elpedes et al. | |
| 8,499,465 B2 | 8/2013 | Kuta | |
| 8,873,149 B2 | 10/2014 | Bohn et al. | |
| 9,835,412 B1 | 12/2017 | Finnegan et al. | |
| 10,345,077 B1 * | 7/2019 | Loebig | G02B 5/32 |
| 2012/0314283 A1 | 12/2012 | Jahromi | |
| 2019/0383578 A1 * | 12/2019 | Mills | G02B 17/0808 |
| 2020/0018883 A1 | 1/2020 | Voloschenko et al. | |
| 2021/0262758 A1 * | 8/2021 | Parker | F41G 3/165 |

FOREIGN PATENT DOCUMENTS

| | | |
|---|---|---|
| EP | 3 348 950 A1 | 7/2018 |
| GB | 2 233 785 A | 1/1991 |

OTHER PUBLICATIONS

Wikipedia webpage "Holography" (Year: 2020).*
Smith, Warren J.; "Practical Optical System Layout: and Use of Stock Lenses", McGraw Hill Professional, 1997, 192 pages.
European Combined Search and Examination Report dated Jan. 14, 2021 from corresponding GB Patent Application No. GB2020012.7, 9 pages.

* cited by examiner

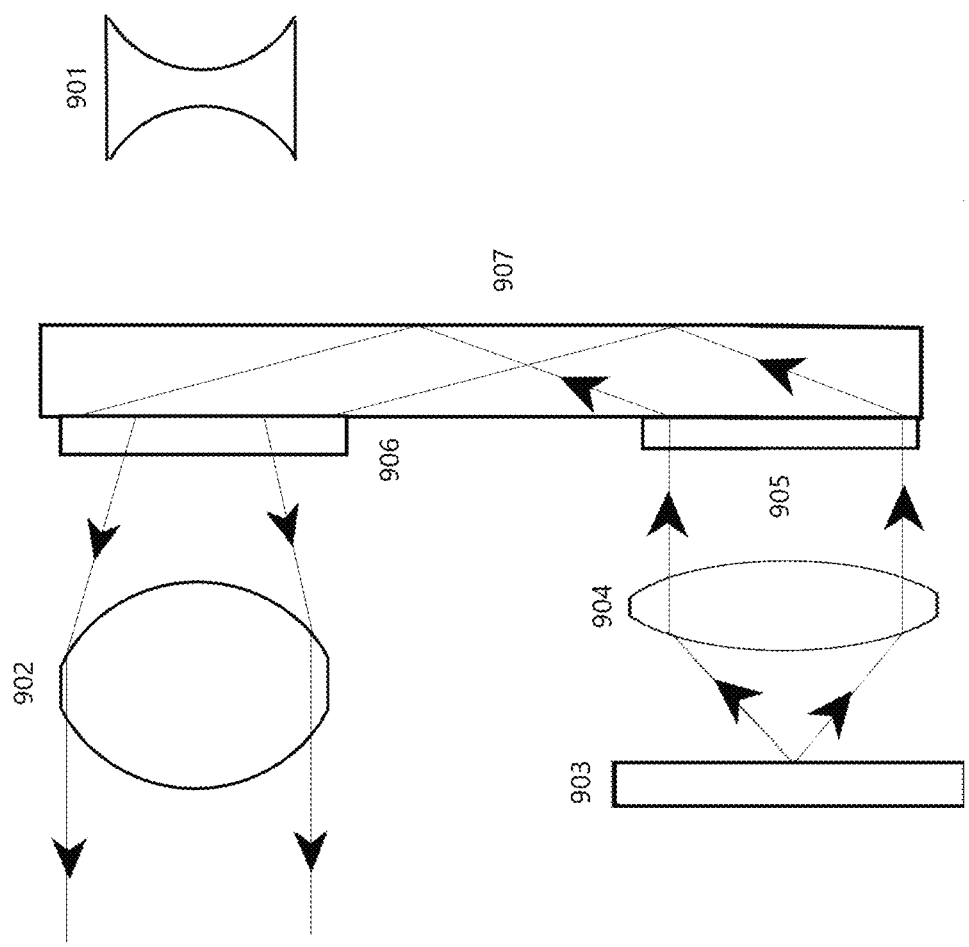
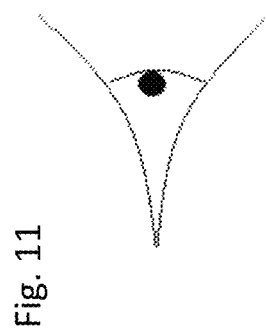
Fig. 11

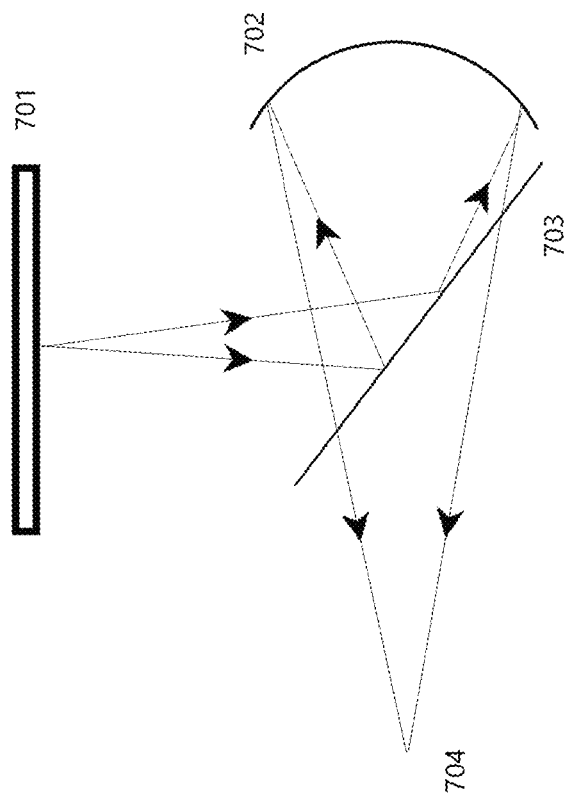
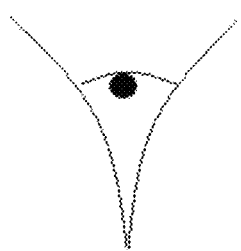
Fig. 12

RETICLE OVERLAID WITHIN A GALILEAN MAGNIFICATION SYSTEM

CROSS REFERENCE TO RELATED APPLICATION

This application claims the benefit under 35 U.S.C. § 119(a) of United Kingdom Application No. GB 2020012.7 filed Dec. 17, 2020, the contents of which are incorporated by reference herein in their entirety.

BACKGROUND OF THE DISCLOSURE

1. Field of the Disclosure

The disclosure concerns an optical system that may form part of an optical device with magnification optics, for example a Galilean telescopic gun sight incorporating a targeting holographic reticle or a reticle device based on a concave mirror with optical power.

2. Description of the Related Art

The basic design of a magnifying device depends on the user's application, but typically requires at least two lenses, one lens referred to as the objective lens (oriented towards the real world, where the real world is referred to as the object) and one lens referred to as the eyepiece lens (oriented towards the user's eye, or a camera). The magnified view of the real world as viewed by the eye is referred to as the image. There are many different variations of this two lens design, all of which can be referred to as telescopes for the purposes of this disclosure, including astronomical telescopes, terrestrial telescopes, telescopic gunsights, binoculars, monoculars, spyglasses, bird spotters, range finders, field glasses, opera glasses, camera lenses, camera viewfinders, beam expanders, beam reducers, surgical or dental loupes and microscopes. The choice of magnifier is largely determined by the working distance (the distance the object is likely to be viewed at) and the angular magnification required. With short working distances (less than 50 cm) single lenses can be used, such as jewellers' loupes or magnifying glasses.

If the object to be viewed is at a far distance (greater than about 20 m), the telescope device can be classed as afocal (both the light rays entering and exiting the telescope are largely parallel or collimated).

The total length of the telescope is largely determined by the addition of the focal lengths of the two lenses. The angular magnification of the telescope is determined by the ratio of the objective lens focal length to the eyepiece lens focal length and is typically positive, indicating the image is enlarged relative to the object. Hence, the objective lens has a longer focal length than the eyepiece lens. If the magnification is negative, the image appears smaller than the object and hence is reduced or de-magnified. This may be used when a larger FOV of an object is required, for example in eye tracking applications or in a camera viewfinder.

Two main types of refracting telescopes are known: the Galilean telescope; and the Keplerian telescope. Referring to FIG. 1, there is schematically shown a known Galilean telescope configuration, comprising: a positive objective lens 101; and a negative eyepiece 102, which provide a magnified view of the real world to the viewer 103. The objective lens 101 is typically larger in diameter than the eyepiece lens 102.

With reference to FIG. 2, there is schematically shown a known Keplerian telescope, comprising: a positive objective lens 201; and a positive eyepiece lens 202. An intermediate image position 204 allows placement of a physical reticle.

The Galilean telescope provides an upright, magnified image of the real world and hence is often used in terrestrial applications, whereas the Keplerian design provides an inverted view of the real world, so is more suitable for astronomical applications. As will be explained below, the field of view (FOV) is reduced in the Galilean design compared to the Keplerian design, especially at high magnifications (greater than 4 times angular magnification). Therefore, most telescopes or binoculars use a Keplerian design. If the image to be viewed is a terrestrial object, the image is erected (re-inverted) with an extra (field) lens or prisms. Terrestrial applications with relatively low magnifications for a Galilean telescope may include opera glasses, field glasses (a version of binoculars) or surgical loupes.

As shown in FIG. 1, a Galilean telescope typically has a positive focal length objective lens 101 (a plano-convex or biconvex lens) and a negative focal length eyepiece lens 102 (a plano-concave or biconcave lens). A Keplerian telescope, as shown in FIG. 2, has a positive objective lens 201 and a positive eyepiece 202. Typically, a Galilean telescope will be shorter, lighter, less bulky and less expensive than a Keplerian telescope with identical magnification.

The main reason that Keplerian telescopes are chosen over Galilean telescopes is that the location of the exit pupil (the position of the eye which will see the maximum FOV) is well-defined and behind the eyepiece lens. Referring to FIG. 3, there is schematically depicted a known Keplerian telescope showing exit pupil diameter and eye relief. This is similar to that shown in FIG. 2 and comprises: a positive objective lens 301; a positive eyepiece lens 302; and an intermediate image plane 303. FIG. 3 also shows ray tracing of chief and marginal rays, which show the location of a discrete exit pupil outside of the telescope (between the eyepiece lens 302 and the user's eye) with a certain exit pupil diameter 304 and eye relief 305. The eye must be placed here to view the whole FOV. The defined exit pupil and internal aperture stops result in higher image quality. For Galilean telescopes, the exit pupil is in front of the eyepiece lens 102 and hence is not well-defined (the pupil of the user's eye effectively becomes the exit pupil). The maximum FOV viewable by the eye in a Galilean telescope is limited. This becomes a greater issue as the magnification of the telescope device increases. Nonetheless, a low magnification Galilean system has a very large effective exit pupil and the Keplerian external exit pupil can make it hard to position the user's eye correctly to see the whole FOV.

Another reason that Keplerian telescopes are preferred over Galilean telescopes is that as there is an intermediate focus (image plane 303). Then, a physical reticle (sometimes called a reticule, or graticule) can be placed at this plane. The reticle is then in focus with and at the same focal plane as the real world object. Thus, the magnified reticle is overlaid with the real world when viewed via the eyepiece lens 302. The original reticle was a pair of crossed hairs (crosshair) or wires which were backlit by the light passing from the objective lens 301. Reticles made from lines etched into glass and illuminated by a separate light source are also known for low light viewing. Such a reticle allowed for a calibrated telescopic gunsight, whereby the centre of the crosshairs would be placed on the target, so as to be quicker and more accurate than aligning iron sights (back and front alignment marks on a gun).

Since the reticle is in the plane of the target object (assuming the target is in sharp focus), then as the user moves their head, the reticle does not move relative to the target object. This can be referred to as 'zero parallax', or no parallax error. This means that the position of the user's head or eye is less critical and provides higher accuracy when firing. An example of a Keplerian telescopic sight with a physical reticle at the intermediate image, is described in US-2012/0314283 A1.

As noted in "Practical optical system layout", Warren J. Smith, McGraw-Hill (1997) "another limitation of the Galilean is that, since there is no internal focal point, a crosshair or reticle cannot be used; the Kepler or terrestrial forms are used when a reticle is needed". Approaches for providing a reticle for use with a Galilean telescope typically superimpose a reticle on the field of view. For example, a dot reticle can be placed on the objective lens of a Galilean telescope, as suggested in GB-1910-05558. U.S. Pat. No. 2,382,631 A proposes a reticle set at a virtual distance but placed outside a Galilean telescope. A Van Albada camera viewfinder design (a mirror coated lens), for instance as described in U.S. Pat. No. 3,024,691 A can alternatively be used.

Also collimated reticles can be used, which do not need to sit within the optical magnification, so parallax and eye relief are not issues. Such approaches make the optical system, comprising the magnification device and the reticle device bulky. A first example of a collimated reticle is discussed with reference to FIG. 4, in which there is shown a schematic view of a typical red dot reticle (reflex sight or non-real world magnifying reflector). This comprises a point source LED 401, which typically emits light through a pinhole, and an off-axis partially-transparent spherical (or aspherical, or parabolic) mirror 402 providing a far distance virtual image of the red dot to the user 403. This projects an image of the dot to infinity (or the target focal plane). The distance from the LED 401 to the concave mirror 402 is less than the focal length of the concave mirror 402, to provide a virtual image. The mirror is designed to be a finite-infinite conjugate system, that is, the object is at a finite distance and the image appears at a far (infinite) distance. U.S. Pat. No. 8,443,541 B2 describes an example of such a design. A red dot reticle allows for quick target acquisition, a bright daylight and low light viewable reticle and large FOV of the real world. However, some zero-order light (light that is not reflected by the concave mirror 402) passes through the sight towards the target, potentially making the shooter visible. Also, the curvature of the concave mirror 402 may affect (distort) the real world see-through, so a compensating element may be put on the back of the mirror to correct this.

A 1 times magnification reticle may be matched with a magnifier, typically a Keplerian telescope of 4 times magnification. The magnifier may be detachable, allowing for short range, high FOV sighting with a red dot or long range, low FOV accurate sighting with the telescopic sight. The telescope typically goes between the red dot sight and the eye. Otherwise, the eye relief may be unsuitable for use (if the telescope is in front of the red dot). Due to the fact that the brightness of the LED through the pinhole is proportional to the size of the pinhole (squared), the final size of the magnified dot viewed by the eye should not be too small or the image will be too dim. Also, due to the off-axis nature of the spherical mirror 402, aberrations are introduced which typically limit the reticle to a dot rather than a more complicated object. The aberrations may limit the parallax error to a non-zero value. The separate magnifier is also bulky due to the use of two separate components (red dot and magnifier).

In relation to collimated reticles, reference is further made to FIG. 5, in which there is schematically illustrated a known "birdbath" technique for reticle display. This configuration comprises: a dynamic digital microdisplay reticle 601 (or backlit reticle); a partially transparent concave mirror 602; and a partially transparent beam splitter 603. Light from the reticle is projected onto the beam splitter 603, which reflects the light away from the user 604 to the partially transparent concave mirror 602 and from there, the light is magnified and reflected to the user 604, providing a virtual image overlaid on the real world at a certain depth plane (typically several metres, considered a far distance). The distance between the reticle 601 and the mirror 602 is slightly less than the focal length of the mirror 602. Such a design can be used in an augmented reality near-to-eye display, for instance as discussed in U.S. Pat. No. 8,873,149 B2.

Another example of a collimated reticle is a holographic reticle (sight), for example as described in U.S. Pat. No. 6,490,060 B1 or EP-3348950 A1. Light from a laser diode replays a hologram that has been recorded with an image of a reticle pattern. Before reaching the hologram, the light is first collimated and diffracted by a reflective diffraction grating, to compensate for any wavelength variation of the laser diode. The light from the hologram is collimated. The combination of the length of a holographic reticle and magnifier is too long and bulky for many applications.

A holographic reticle may have advantages over a red dot reticle. The angular size of a red dot reticle or holographic reticle is typically defined in minutes of arc (MOA), which may be around 3 to 6 MOA in practice. An angular size of 3 MOA at 90 m (100 yards) would cover 7.6 cm (3 inches) of the real world. If a red dot sight is used with a magnifier, the dot will then be magnified and hence cover a larger area. This may hinder target acquisition, if the reticle is larger than the target at the focal plane distance. A holographic sight can be fabricated with very small features, which are smaller than the human eye acuity limit (1 MOA) and hence appear as 1 MOA features (limit of eye). When these holographic sights are magnified, they can remain with the same angular size as unmagnified.

A holographic reticle may also be advantageous as it can use all the brightness of the replay source and minimises the parallax error. For a red dot reticle, a partially-silvered or dichroically-coated reflective mirror may be needed, and the physical curvature and tint of the mirror may affect the real world see-through. A holographic sight can use a flat, transparent aperture to improve real world see-through. However, a red dot reticle can use an LED for replay, whereas a holographic reticle typically requires a laser replay with extra components to maintain reticle stability (that is the position of the reticle on the real world should not change as ambient temperature changes).

Providing a reticle that can be used within a Galilean telescope is potentially advantageous to provide a compact, low magnification telescopic sight solution without the drawbacks of a bulky Keplerian solution. U.S. Pat. No. 8,499,465 B2 considers a "birdbath" optics design within a sighting Galilean telescope. Light from a reticle is directed through a target lens onto a beam splitter placed on the axis between the objective lens and the eyepiece lens. However, this design does not realise any of these potential advantages suggested above, as the distance between the reticle and the beamsplitter can be significant and the resultant system consequently remains bulky.

It therefore remains a challenge to provide a reticle within a Galilean telescope to result in a compact, low magnification telescopic sight solution with the same advantages as a reticle used in a Keplerian magnification device.

SUMMARY

Against this background, there is provided an optical system. This may advantageously provide a compact low magnification Galilean telescope (having objective and eyepiece lenses) with a reticle integrated within. According to this aspect, an optical system and/or a method of manufacturing or operating an optical system may be considered. The reticle is generated at the correct focal plane using a hologram or other holographic element (such as a holographic optical element). The light from the holographic element is set at the image working distance by the eyepiece lens (light from the objective lens is also advantageously set at this distance by the eyepiece lens). The image working distance is typically defined by the focal length of the eyepiece lens. The reticle device generally uses light from an off-axis source (the axis being between the objective and eyepiece lenses) and redirects the light on-axis. This can fill a gap in the market for a compact low magnification system, for example that can fit on a handgun or pistol barrel (but is not limited to this application), with a parallax free holographic reticle at the target focal plane.

The hologram can be on a transparent substrate. In one implementation, the holographic element is positioned generally on-axis, although it can be tilted. A waveguide can output off-axis light on the axis, pre-compensated for the eyepiece lens. In some embodiments, a linear incoupler and a linear outcoupler are used. In other embodiments, the waveguide transmits incoupled light, which is outcoupled by a holographic outcoupler, onto which a static reticle image is recorded. The outcoupler (particularly, a holographic outcoupler) can have an optical power to converge or diverge the outcoupled light (so as to be pre-compensated for the eyepiece lens). Light can be collimated before being incoupled to the waveguide. A replay light source is preferably used to illuminate the hologram.

In one implementation, a backlit or light source reticle (for example a display or micro-display) can be positioned off-axis. A Holographic Optical Element (HOE) lens can diffract light from the display (or other similar light source reticle) so as to pre-compensate for the eyepiece lens.

In another aspect, a pre-compensated reflex sight (red-dot reticle) or "birdbath" arrangement is considered, particularly using a partially transparent concave mirror to reflect reticle light towards the eyepiece lens. By applying an optical power to the reflected light, the mirror can pre-compensate the reflected light for the eyepiece lens (so that the eyepiece lens sets the reflected light at the image working distance).

A distance between the reticle light source and the mirror is made greater than a focal length of the mirror, which can allow pre-compensation for the eyepiece lens in a compact way. Using a positive lens or concave mirror, which can be referred to as "finite-infinite conjugate" as discussed above, if the object is slightly closer than the focal length, then the image is virtual and magnified and at a far distance (the case with say an existing red dot sight implementation). If the object is further than the focal length, then the image becomes a real image at a near distance, and can then be set by the negative eyepiece lens to the desired far virtual focal distance. An off-axis parabolic or spherical mirror can be used in some cases. Advantageously for a reflex sight implementation, an ellipsoidal mirror is used. The ellipsoidal mirror is preferably partially transparent and/or positioned off-axis.

For a "birdbath" arrangement, a beam splitter can be positioned on the axis, directing light from the reticle light source to the concave mirror, but transparent to light reflected from the concave mirror.

In all aspects of the optical system, there are two options: a magnifying arrangement in which the objective lens is positive and the eyepiece lens is negative, such that light (from the hologram, waveguide or mirror) converges towards the eyepiece lens; and a "reverse" arrangement in which the objective lens is negative and the eyepiece lens is positive, such that the light diverges towards the eyepiece lens.

The Galilean magnification device can comprise one of: an astronomical telescope; a terrestrial telescope; a telescopic gunsight; a binocular device; a monocular device; a spyglass; a bird spotter; a range finder; a field glass; an opera glass; a camera lens system; a camera viewfinder; a beam expander; a beam reducer; a surgical loupe; a dental loupe; a jeweller's loupe; and a microscope.

Another aspect relates to recording a holographic reticle for use in a Galilean magnification device. This aspect can be in the form of a recording system or a method of recording. Coherent reference light and coherent object light are directed at a holographic material. The coherent object light is provided through a lens arrangement that causes the light to be converging or diverging on impingement with the holographic material, particularly so as to set an image of a reticle at a real image distance.

The lens arrangement can comprise an objective lens of the Galilean magnification device (or a lens having the same focal length), which can cause the convergence or divergence of the light. It can further include a collimating lens that provides output light as the collimated coherent object light before providing the output light to the objective lens.

In some embodiments, the coherent object light is directed through a diffuse reticle mask to the lens arrangement, which can cause a holographic reticle to be recorded on the holographic material. Alternatively, light from a coherent point source can be directed to the lens arrangement, such that a holographic optical element lens is recorded on the holographic material.

Combinations of aspects or features from aspects can also be considered, where such combinations are feasible.

BRIEF DESCRIPTION OF THE DRAWINGS

The disclosure may be put into practice in a number of ways and preferred embodiments will now be described by way of example only and with reference to the accompanying drawings, in which:

FIG. 11 depicts a schematic configuration for applying a holographic reticle to a Galilean magnification system in accordance with a third embodiment of the disclosure.

FIG. 12 schematically illustrates a "birdbath" technique for reticle display in accordance with a yet further aspect of the disclosure.

DETAILED DESCRIPTION

Figure 1:
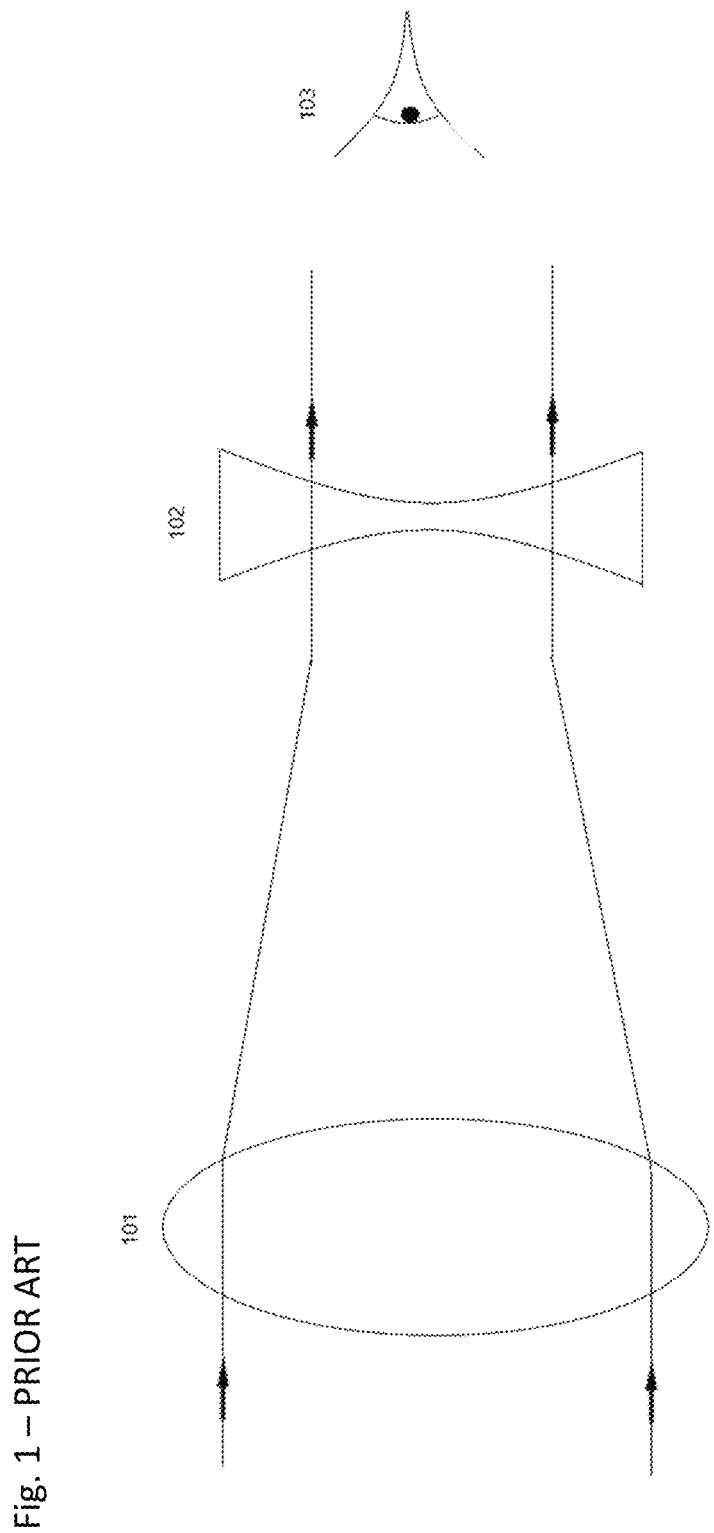
FIG. 1 schematically shows a known Galilean telescope configuration.
Figure 2:
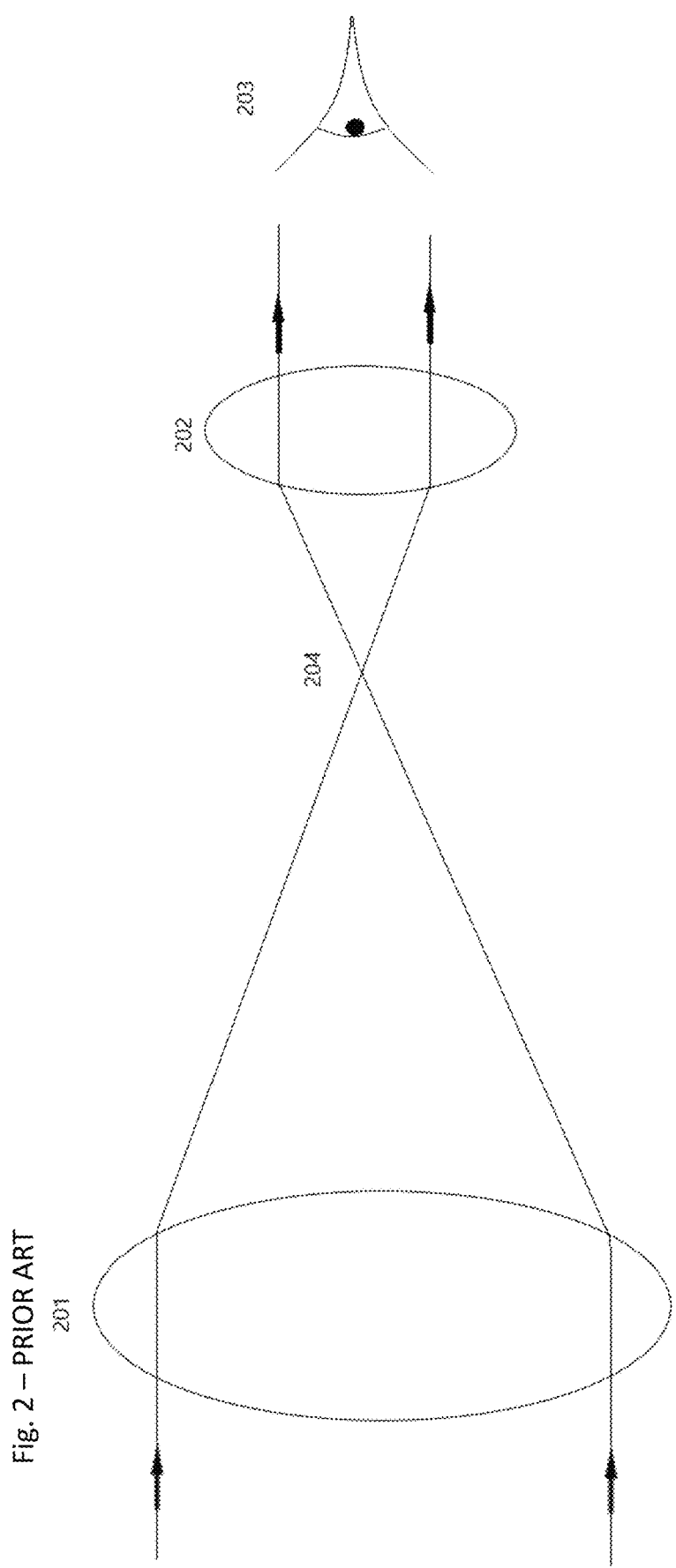
FIG. 2 schematically shows a known Keplerian telescope.
Figure 3:
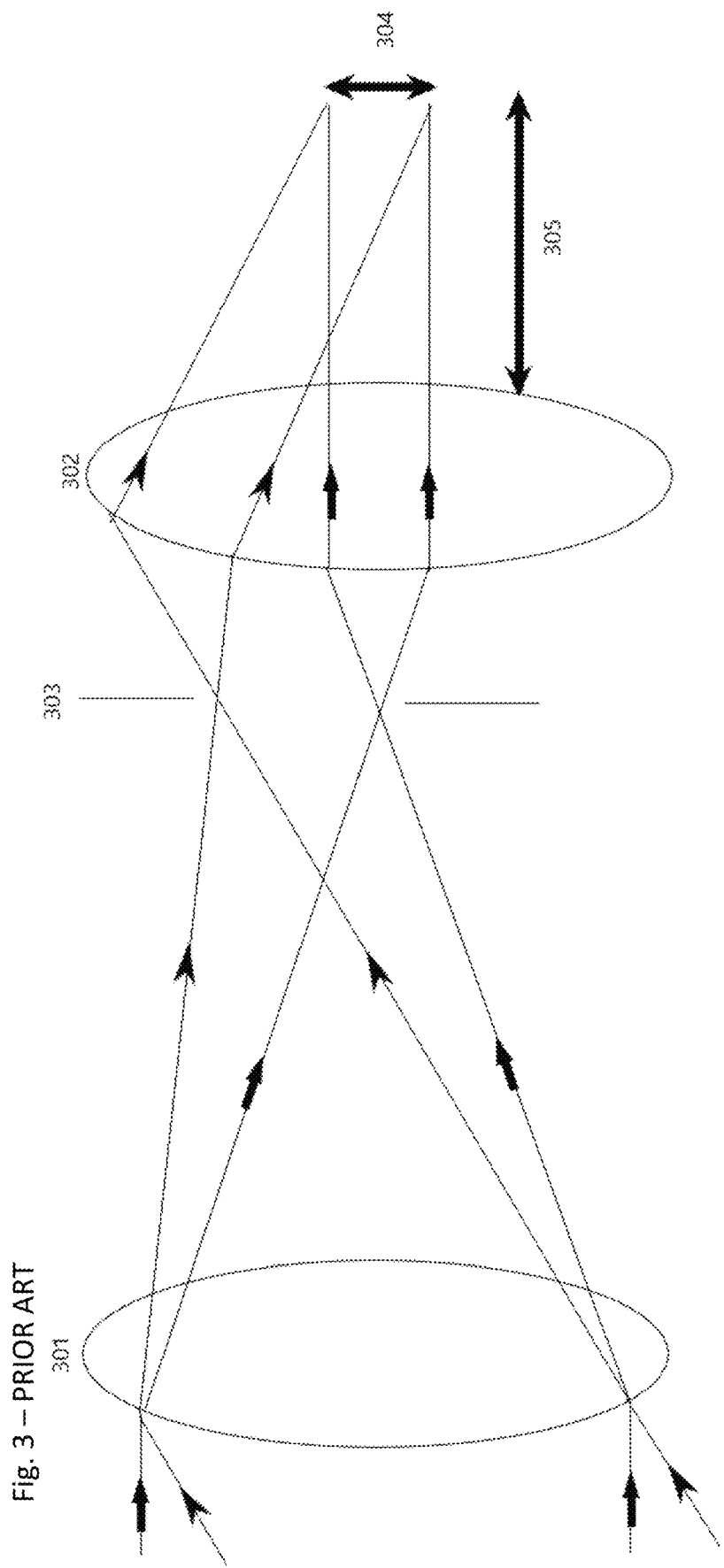
FIG. 3 schematically depicts a known Keplerian telescope showing exit pupil diameter and eye relief.

Before discussing specific embodiments, some further comments are provided on the benefits of Galilean magnification device designs over Keplerian designs, especially for certain applications. The addition of a reticle to a Galilean magnification device in such applications, with the same advantages as a reticle used with Keplerian designs, is therefore of benefit.

Image brightness can be an important factor in magnification of distant objects. The image brightness of an extended source may be determined by the size of the beam entering the eye. Thus, a Keplerian design with an external exit pupil can be devised to match the typical diameter of the human eye pupil (3 to 7 mm, depending on age and lighting conditions). For a point source (for example, a star), the brightness is also increased by increasing the diameter of the objective lens. As the magnification increases, the effective exit pupil becomes smaller for a Galilean telescope. Therefore, a Keplerian design is preferred for higher magnifications. However at lower magnifications (no more than 4 times), the limited exit pupil (and hence brightness) of a Galilean telescope is less of an issue.

Although a Galilean telescope tends to have lower image sharpness at the edges of the FOV, the aberrations due the two positive lenses in a Keplerian telescope tend to compound, whereas the aberrations due to the positive and negative lenses in a Galilean telescope tend to compensate. This means that simpler, lighter and less expensive single lenses can be used in a Galilean telescope, rather than complex compound lenses in a Keplerian telescope.

The extra number of optical elements required in a Keplerian telescope (due to the erector prisms) also increases weight, cost, alignment difficulty and fragility (as the prisms can be misaligned by impact). The extra optical surfaces also reduce optical transmission due to Fresnel reflections, or require extra anti-reflection coatings. The eyepiece lens of a Keplerian telescope is necessarily positive and thus thicker, heavier and with lower optical transmission than a negative eyepiece lens, as found in a typical Galilean telescope.

To increase the magnification of a telescope, either the focal length of the objective lens is increased or the focal length of the eyepiece is decreased. As the focal length of a lens reduces (keeping the diameter of the lens the same), the lens becomes more expensive and produces a more aberrated image. Lenses are typically defined by their focal ratio, or "f-number", the ratio of the focal length to their diameter. For example, a focal length 100 mm lens with a diameter of 50 mm would have a focal ratio of 2, or f/2. Typically, a focal ratio of 4 or higher would be preferred for a high quality image. This relationship links the diameter, length and magnification of a telescope.

Telescopes typically have a nominal working distance, which may be infinity, and also a depth of field where the image is sharp over a range of object distances. The image focus can be adjusted by moving the eyepiece lens. The depth of field reduces as the magnification increases.

To minimise spherical aberrations, the more curved sides of the lenses are placed towards the most parallel rays. In other words, the curved side of the lenses are towards the object and the eye. The flatter (piano) sides face each other inside the telescope.

Telescopes with high magnification typically need to be mounted on a tripod to remain stable, as the smallest movement of the telescope will translate into a large movement relative to the target/object. Hence, vibrations will mean the image is not stable. A telescopic gunsight may have magnification from 4 to 10 times or greater, and hence will often be used with a rifle held in two hands and supported by the shoulder. A rifle may be designed for medium to long distance hunting and have a focal plane at 180 m to 275 m (200 to 300 yards) or more. Binoculars are held with two hands and may have magnifications up to 7 times typically. Lower magnifications, such as 2.5 times opera glasses can be held with one hand. A handgun or pistol held with one hand is typically designed to be used at close range shooting, for instance e.g. 20 m (25 yards), so may typically have no magnification. Some users may prefer a low magnification, for instance 1.5 times or 2 times.

The eye relief (distance from the last element of the scope to the well-defined exit pupil) of Keplerian telescopic sights is generally quite long (8 cm or 3 inches or more) to prevent the gun from hitting the user when recoiling after firing. For a pistol scope, which may be held close to the eye or (more usually) at arm's length, an even longer eye relief is useful, which is provided by a Galilean telescopic sight which has an effectively infinite eye relief (that is, the magnified view of the real world can be seen wherever the user places their eye, although the further away the user is the smaller the FOV of the real world).

The length of a Keplerian scope is a limiting factor when used with a gun, as a long barrel is needed to mount the scope, thus making it difficult to use with short pistols.

The diameter of lenses for telescopic gunsights is typically around 2.5 cm to 3.8 cm (1 to 1.5 inches). For a telescope, the objective lens typically has a larger diameter than the eyepiece lens. The choice of lenses determines the image quality, typically minimising chromatic aberration (colours from the real world focus at different distances, causing fringing around objects). A singlet lens generally has worst performance, then a doublet, then an achromatic, then an apochromatic triplet, but the cost, weight and thickness rises commensurately. As the magnification increases, the quality of the lenses should typically increase to provide an unaberrated image.

As the magnification of a telescopic sight reduces, the length typically reduces. With a Keplerian telescope, the length cannot reduce significantly. With a Galilean telescope, the length can reduce significantly with a low magnification. For example, for a 1.5 times magnification with 150 mm focal length objective, 100 mm focal length eyepiece, 30 mm diameter lenses (approximately f/4 or f/2), a Keplerian telescope at normal adjustment (object at infinity) would have a magnification of 150/100=1.5 and a length of 100+150=250 mm. A Galilean telescope would have a shorter tube length of 150−100=50 mm. This is a significant advantage. As the magnification of the scope increases (greater than 4 times) and the focal length of the lenses increases, this difference becomes less significant.

With magnification optics for short working distance applications (for example, a jeweller's loupe), a Keplerian scope is typically used with a reticle at the intermediate image. Sometimes a shorter, simpler Galilean system is used but the reticle is overlaid at the object plane, so only flat objects can be used with a reticle. A magnifier typically has a very similar design to a telescope, but the lenses have a shorter focal length and the eyepiece lens has a larger diameter than the objective lens. With a surgical loupe (such as small telescopes attached to glasses designed for surgeons), Keplerian systems are typically used for magnification greater than three times due to the increased FOV, whilst Galilean loupes are used at lower magnifications for ease of alignment (large undefined exit pupil) and lower weight and length. The Keplerian surgical loupes sometimes have a reticle at the intermediate image plane for measurements and/or alignment. Surgical loupes have a medium working distance (tens of cm).

The present disclosure provides a number of approaches for adapting a collimated reticle to be used with a Galilean magnification device. It has been recognised that such reticles can be placed between the objective lens and the eyepiece lens of a Galilean magnification device, with the light provided by the reticle being compensated for the eyepiece lens. In other words, light is provided from the reticle at the eyepiece lens such that the eyepiece lens collimates that light. The same advantages as for a reticle in a Keplerian magnification device can thereby be obtained. This can be achieved without making the overall optical system (comprising the Galilean magnification device and the reticle device) bulky, by using a holographic reticle that outputs compensated light, by using a red dot reticle with an ellipsoidal mirror or a reticle using "birdbath"-type optics configured to provide light compensated for the eyepiece lens (rather than collimated light). These approaches can therefore be implemented in a number of ways, as will be discussed below.

Figure 6:
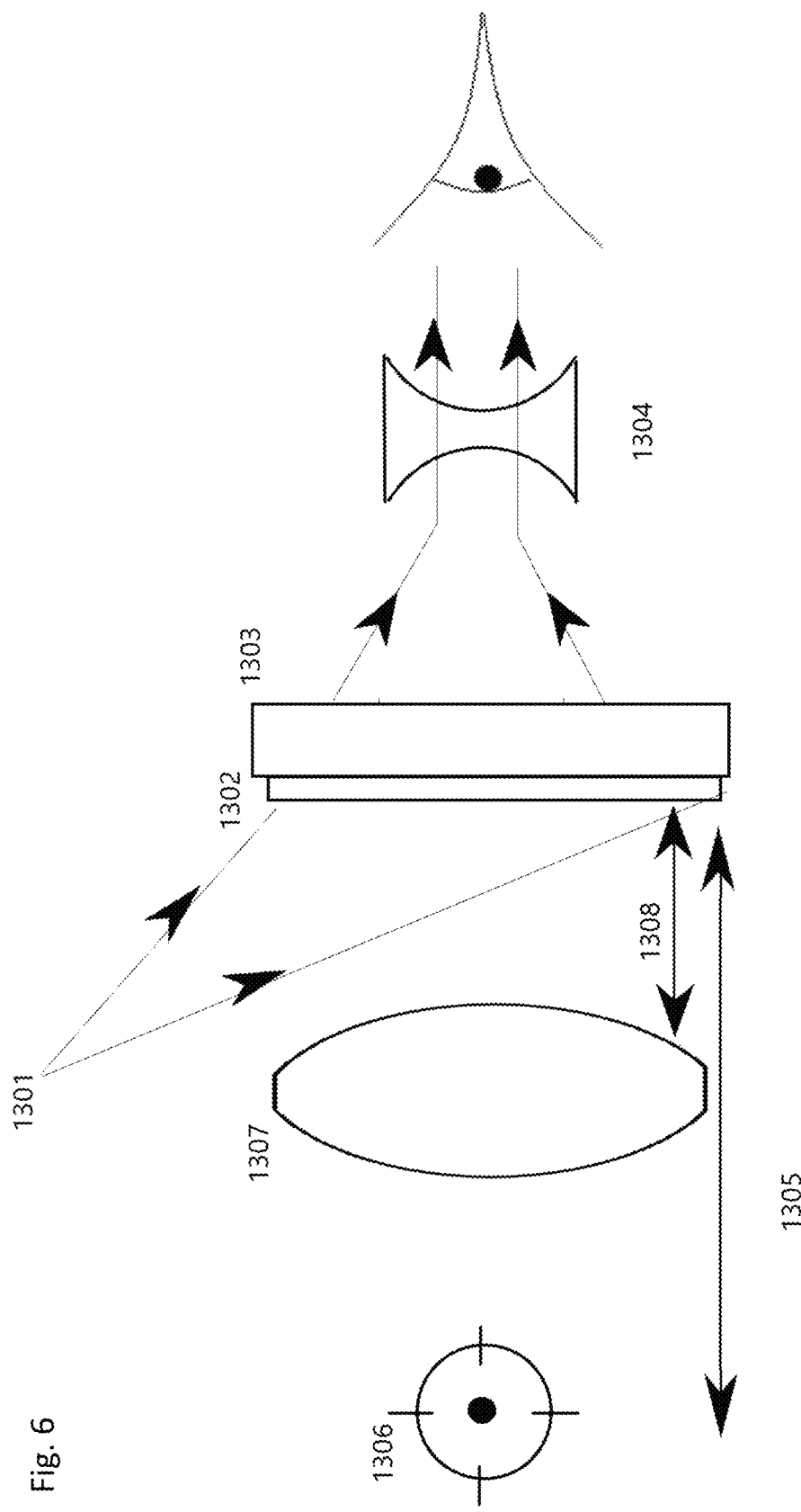
FIG. 6 depicts a schematic configuration for applying a holographic reticle to a Galilean magnification system in accordance with a first embodiment of the disclosure.

A first preferred approach uses a holographic reticle. Referring to FIG. 6, there is depicted a schematic configuration for applying a holographic reticle to a Galilean magnification system in accordance with the disclosure. The optical system comprises: eyepiece lens 1304; objective lens 1307; a replay light source 1301; and hologram 1302. The holographic reticle is recreated as a converging beam 1303, which is then set by negative eyepiece lens 1304 to view the reticle 1306 at the correct virtual image distance 1305. The reticle device, comprises the replay system that includes the replay light source 1301, the hologram 1302 and the eyepiece lens 1304. The reticle device is placed within the Galilean telescope formed by the objective lens 1307 and the eyepiece lens 1304. The real world is viewed magnified through the Galilean telescope.

This provides a compact Galilean telescope with a correctly focused virtual reticle overlaid on the magnified view of the real world. With a typical lens diameter of 2.5 cm (1 inch), a low magnification (1.5 to 2 times) Galilean telescope incorporating a holographic reticle could provide a magnifier plus reticle within a volume of about 16.4 cm³ (1 cubic inch), which is a significant size reduction compared with existing systems.

In general terms, there can therefore be considered an optical system, comprising: a Galilean magnification device; and a (holographic) reticle device. The Galilean magnification device comprises an objective lens and an eyepiece lens, one of the objective lens and the eyepiece lens being a positive lens and the other being a negative lens. An image working distance is thereby defined. The image working distance is often associated with microscopes, but can be applied to any magnification device and typically represents the ideal distance between the object and the magnification device (specifically the objective lens). This could be, for example, infinity (for instance for an astronomical telescope), 200 m (for instance for a rifle), 40 cm (for a surgeons' loupe). A nominal or average image working distance may sometimes be considered, especially where adjustment of the image working distance is possible. The image working distance can also correspond with the focal plane, for example in the sense that the magnification device can operate with a certain focal plane.

The objective lens and an eyepiece lens define an axis. In a strict sense, "on-axis"—is understood as propagation of the chief ray parallel to the normal of the optical surfaces and "off-axis" represents propagation of the chief ray at an angle to the normal of the optical surfaces. However, the axis can more broadly be understood based on the alignment of the objective lens and eyepiece lens.

The reticle device is then configured to replay a hologram or illuminate a holographic element such that light from the hologram or holographic element is set at the image working distance (for example, collimated or more preferably, set a specific focal plane) by the eyepiece lens. In particular, this can be achieved by the reticle device providing light to the eyepiece lens that is pre-compensated for the eyepiece lens. In some cases, this can mean that an output optical element (for example, lens or mirror) of the reticle device (that provides light to the eyepiece lens) receives substantially collimated light and has an optical power that is equal and opposite to an optical power of the eyepiece lens. The reticle can be overlaid on the same focal plane as the real world. This is often termed "zeroing the sight" in gunsights at a specific distance, where there is no parallax shift with the reticle at that chosen distance and the reticle is at sharpest focus. It should be noted that the real world will be in good focus across a certain range (due to depth of field of the real world), but the reticle typically only has zero parallax at one distance. Alternatively, this may be understood as setting the reticle at the preferred user viewing distance for comfortable simultaneous eye accommodation of the real environment and the artificial image.

The reticle device is advantageously configured to receive light for illuminating the holographic element from off the axis and to direct light from the holographic element on the axis.

In an embodiment, the reticle device comprises a holographic element, for instance a hologram (for example, on a transparent substrate) or holographic optical element (HOE) positioned generally or substantially on the axis. The reticle device preferably comprises an off-axis replay light source (for instance, a laser or LED) configured to illuminate the holographic element. Optionally, the holographic element can be positioned off the axis.

Certain features may be applicable to configurations according to this aspect and also other aspects disclosed herein. Advantageously, the optical system can be configured such that light from the objective lens is set at the image working distance (set at the focal plane or collimated) by the eyepiece lens. In some embodiments, the objective lens is a positive lens and the eyepiece lens is a negative lens. The reticle device can then be configured such that light converges towards the eyepiece lens. Alternatively, the Galilean magnification device can be a reverse Galilean telescope, such that the objective lens is a negative lens and the eyepiece lens is a positive lens. Then, the reticle device can be configured such that light diverges towards the eyepiece lens.

The Galilean magnification device can comprise one of: an astronomical telescope; a terrestrial telescope; a telescopic gunsight; a binocular device; a monocular device; a spyglass; a bird spotter; a range finder; a field glass; an opera glass; a camera lens system; a camera viewfinder; a beam expander; a beam reducer; a surgical loupe; a dental loupe; a jeweller's loupe; and a microscope. Further specific details will now be discussed, but the general senses will be returned to below.

A holographic reticle can therefore be fabricated such that, when placed inside a Galilean telescope, the reticle is seen at the correct focal plane with the (magnified) real world. To achieve this, pre-compensation for the power of the negative eyepiece is provided. This can be achieved in the recording of the holographic reticle.

A holographic reticle is typically recorded using interferometric techniques, with one laser beam (the reference beam) incident on the light sensitive transparent holographic film at an angle, and another laser beam incident on a backlit, physical, transparent, diffuse reticle which is collimated by a lens (object beam). This lens-to-reticle distance is approximately the focal length of the lens and can be adjusted to set the reticle at a virtual distance of (for example) 23 m or 25 yards (for instance, for a pistol sight). When both beams are incident from the same side of the holographic film, the hologram is termed a transmission hologram. When the hologram is replayed with the same reference beam (in a holographic gunsight), a virtual image of the reticle appears at 23 m or 25 yards overlaid on the real world. This is explained below with reference to two specific drawings.

Figure 7:
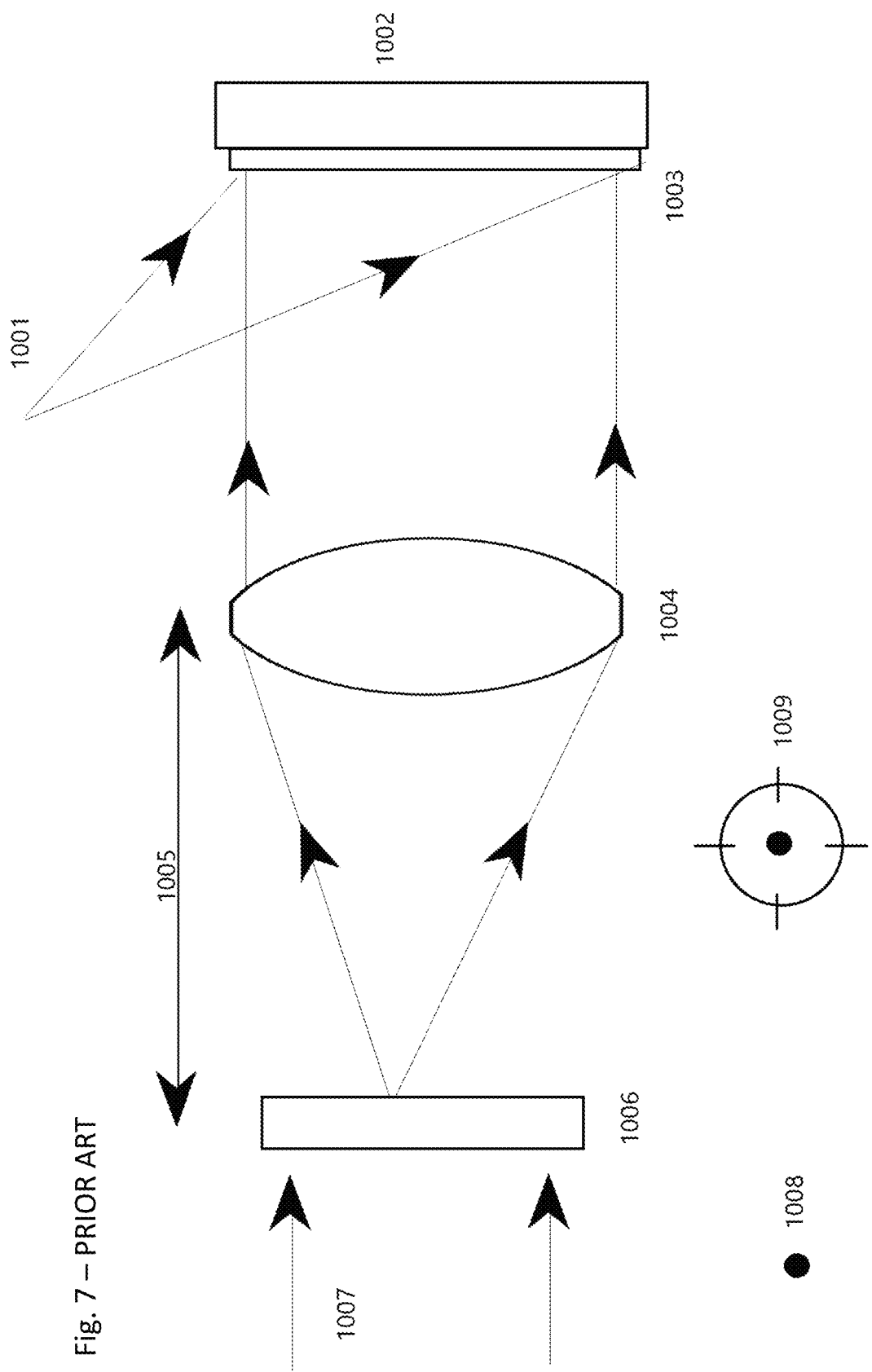
FIG. 7 shows a known schematic layout for recording a holographic reticle for use in an unmagnified gunsight.

Referring to FIG. 7, there is shown a known layout for recording a holographic reticle for use in an unmagnified gunsight. The layout comprises: a coherent reference laser beam 1001; a coherent laser object source 1007; a diffuse reticle mask 1006; a lens 1004; a transparent glass substrate 1002; and a holographic material 1003. The output from a coherent laser light source is split into the coherent reference laser beam 1001 and the coherent object laser source 1007, both of which are incident on a photosensitive holographic material 1003 (for instance, silver halide or photopolymer) to record an interference pattern. When the reference beam 1001 alone is directed onto the recorded hologram, the object beam is reconstructed (that is, the image of the reticle is seen). The coherent reference laser beam 1001 is shown as a diverging beam onto the transparent holographic material 1003, which is placed on the transparent glass substrate 1002. The coherent object laser source 1007 is directed onto the backlit, diffuse reticle mask 1006. This creates an object beam, which is collimated by the lens 1004 onto the holographic material 1003.

The distance 1005 between the diffuse reticle mask 1006 and the lens 1004 is slightly less than the focal length of the lens 1004, to set the reticle at a virtual image distance of (for example) tens of metres. For example, to set the virtual image distance of the backlit reticle to 23 m or 25 yards (when using a lens 1004 of 100 mm focal distance), the distance 1005 is set to 99.6 mm. The reticle image could be a dot 1008 or a crosshairs 1009, for example. This is considered a transmission hologram, as the object and reference beam are from the same side, but as is known in the art many other variations of this simple holographic reticle design could be used (for instance, reflection geometry with the recording beams from opposite sides of the photopolymer). FIG. 7 shows a typical holographic reticle recording geometry, although various embodiments are possible with more complex features including dispersion compensation (wavelength temperature dependent drift of reticle position).

Figure 8:
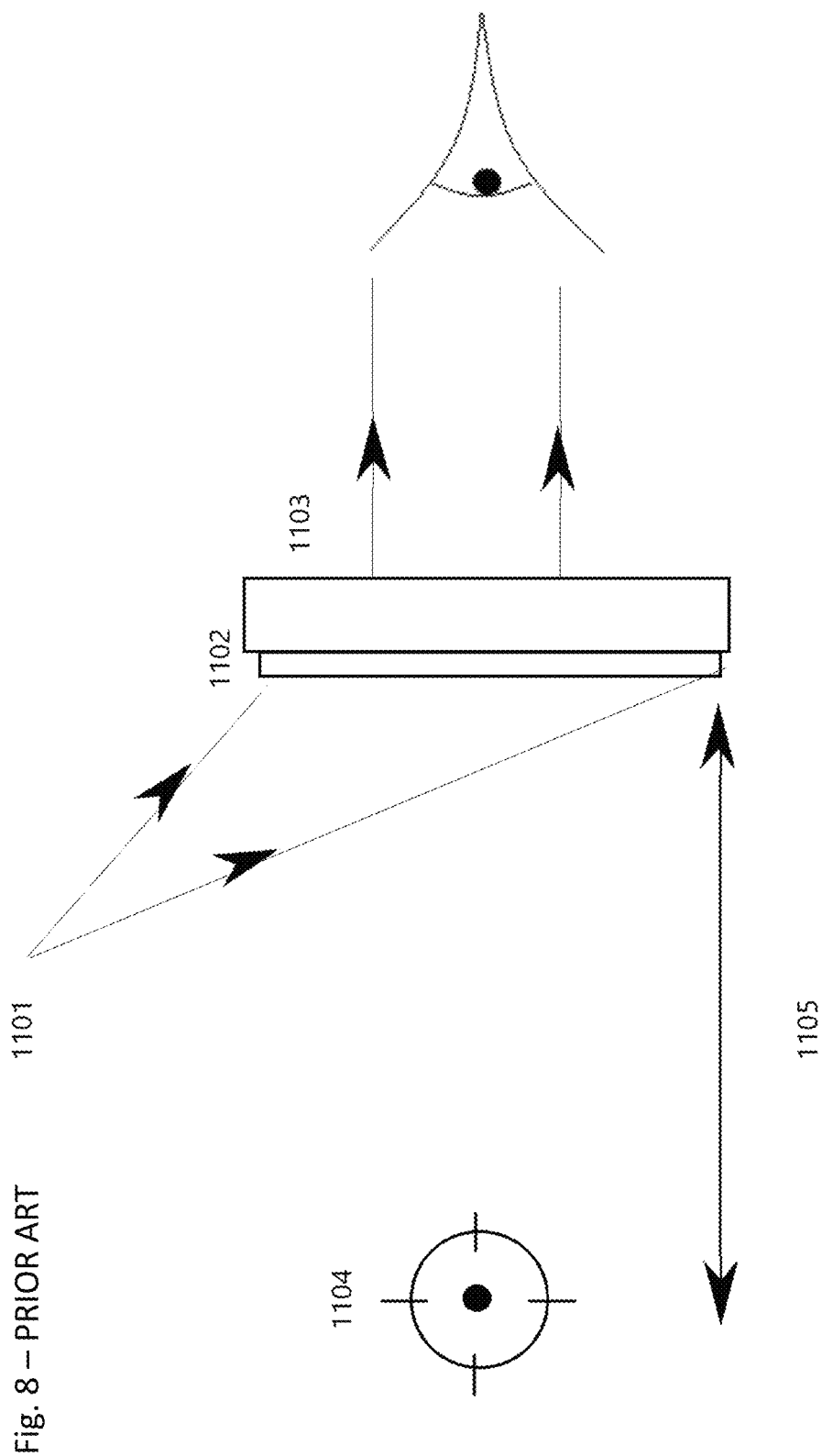
FIG. 8 depicts a known typical schematic layout for replaying the reticle hologram recorded using the layout of FIG. 7.

Referring to FIG. 8, there is depicted a typical schematic layout for replaying the reticle hologram recorded using the layout of FIG. 7. This comprises a replay source beam 1101, a hologram 1102 (for example, as recorded on the holographic material 1003 shown in FIG. 7); and a transparent glass substrate 1103. The replay source beam 1101 is ideally from a laser diode, having the same wavelength as the recording wavelength and originating from the same position and angle as the recording position. The replay source beam 1101 illuminates the hologram 1102, which recreates the object beam, presenting a virtual reticle 1104 at a distance 1105 (the same as the virtual distance in recording, tens of metres) to the user, overlaid on the real (unmagnified) world.

Figure 9:
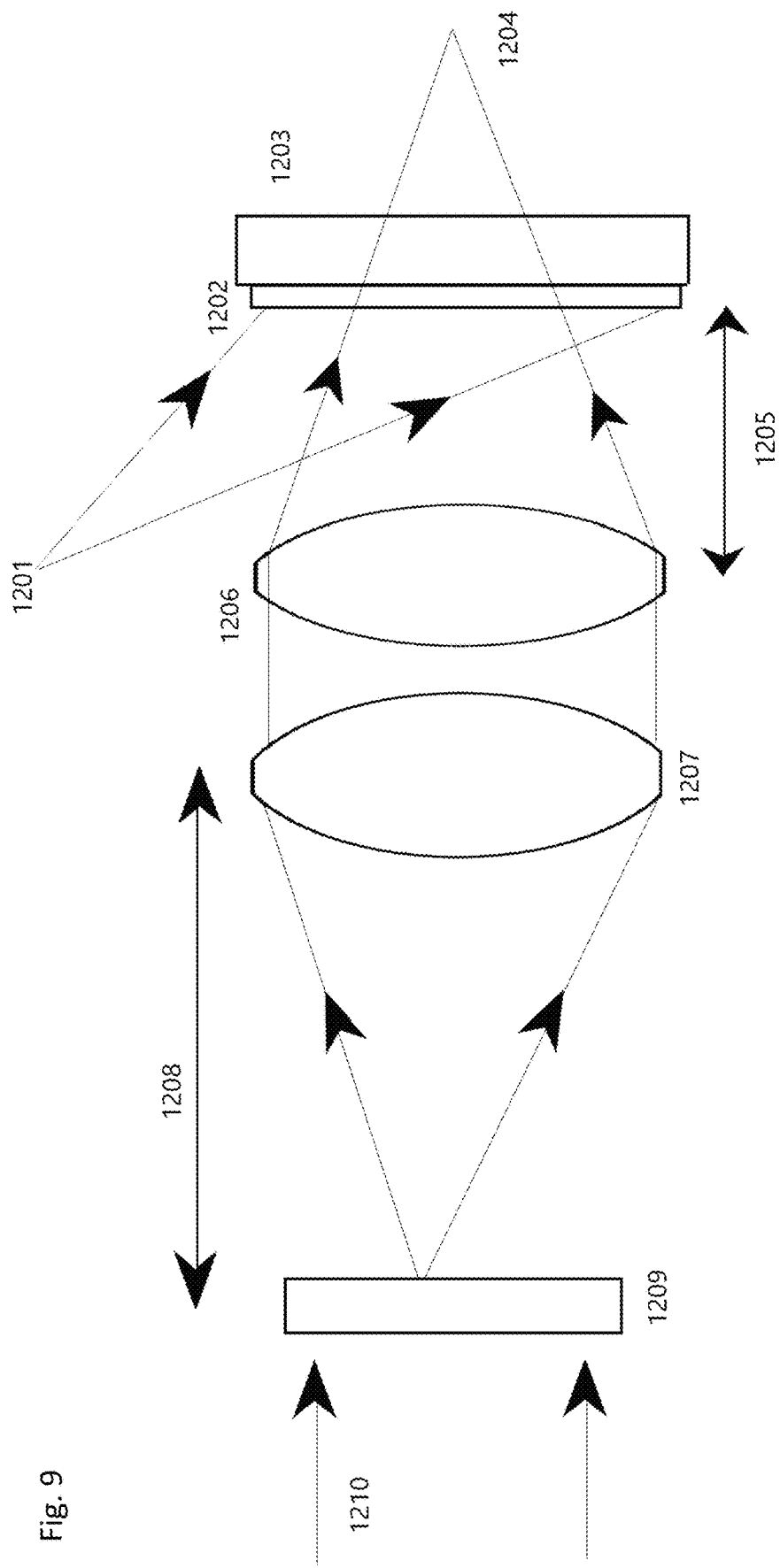
FIG. 9 illustrates an example schematic layout for recording a holographic reticle for use in an embodiment of the disclosure.

Based on the above explanation, it can now be understood how to create the hologram used in FIG. 6. Referring to FIG. 9, there is illustrated an example schematic layout for recording a holographic reticle for use in an embodiment of the disclosure. This comprises: a coherent reference laser beam 1201; a coherent laser object source 1210; a diffuse reticle mask 1209; a first lens 1207; a second lens 1206 (which has the same properties as the objective lens 1307 shown in FIG. 6); a transparent glass substrate 1203; and a holographic material 1202. The use of first lens 1207 and second lens 1206 means that the light from the diffuse reticle mask 1209 is converged, setting the image of the reticle at a real image distance. The distance 1205 between the second lens 1206 and the holographic material 1202 is desirably known accurately. The distance 1205 is the same as distance 1308 (shown in FIG. 6) between the objective lens 1307 and the hologram 1302.

In one example, a Galilean telescope of 1.5 times magnification with objective lens of +150 mm and eyepiece lens of −100 mm is designed. In FIG. 9, the +150 mm objective lens (corresponding with first lens 1206) is placed at a set distance (less than f1−f2, that is, less than 150−100=50 mm) from the holographic film (here it is nominally 40 mm) with the more curved side of the lens towards the second 'collimation' lens 1207. The hologram 1202 is recorded, with added optical power so the reticle now appears at an 'incorrect' focal plane. The hologram can also be recorded using the −100 mm eyepiece lens as a compensating lens in the recording setup, or by adjusting the position of the collimating lens 1207 to set the image of the reticle at a different distance. It is noted that the hologram does not need to be recorded with the identical compensation lenses as will be used in replay, as long as the focal length is the same.

To replay within a magnified gunsight, the hologram is placed inside the Galilean telescope and is replayed with the same reference beam (as described above with reference to FIG. 6). As discussed above, the distance 1308 from the objective lens 1307 to the hologram 1302 in replay is the same as the distance 1205 from the objective lens 1206 to the hologram 1202 in recording (here, 40 mm). When the eye views this pre-compensated hologram through the negative eyepiece lens 1304, the hologram appears at the correct virtual distance, 23 m or 25 yards (for example). The distance of the eyepiece lens 1304 to the objective lens 1307 is slightly shortened compared with a Galilean magnification device without the reticle device, to make the real world appear in focus at 23 m or 25 yards (rather than infinity). The holographic reticle will appear overlaid at this focal plane with zero parallax.

In a general sense, there can be considered a method and/or a system for recording a holographic reticle for use in a Galilean magnification device. The method comprises: directing a coherent reference light at a holographic material; and providing a coherent object light through a lens arrangement to the holographic material, at the same time as the coherent reference light. The system provides: a coherent reference light source; a coherent object light source; a lens arrangement; and a holographic material, configured to implement the method. In either sense, the lens arrangement is configured such that the coherent object light provided therethrough is converging or diverging on impingement with the holographic material, in particular so as to set an image of a reticle at a real image distance.

Preferably, the lens arrangement comprises a collimating lens, arranged to receive the coherent object light and to collimate the received light (provided as output light from the lens); and/or an objective lens of the Galilean magnification device (or a lens having a same focal length as an objective lens of the Galilean magnification device), arranged to provide the converging or diverging light to the holographic material. The objective lens is advantageously further arranged to receive the output light from the collimating lens.

Providing the coherent object light beneficially comprises directing the coherent object light through a diffuse reticle mask to the lens arrangement.

Figure 10:
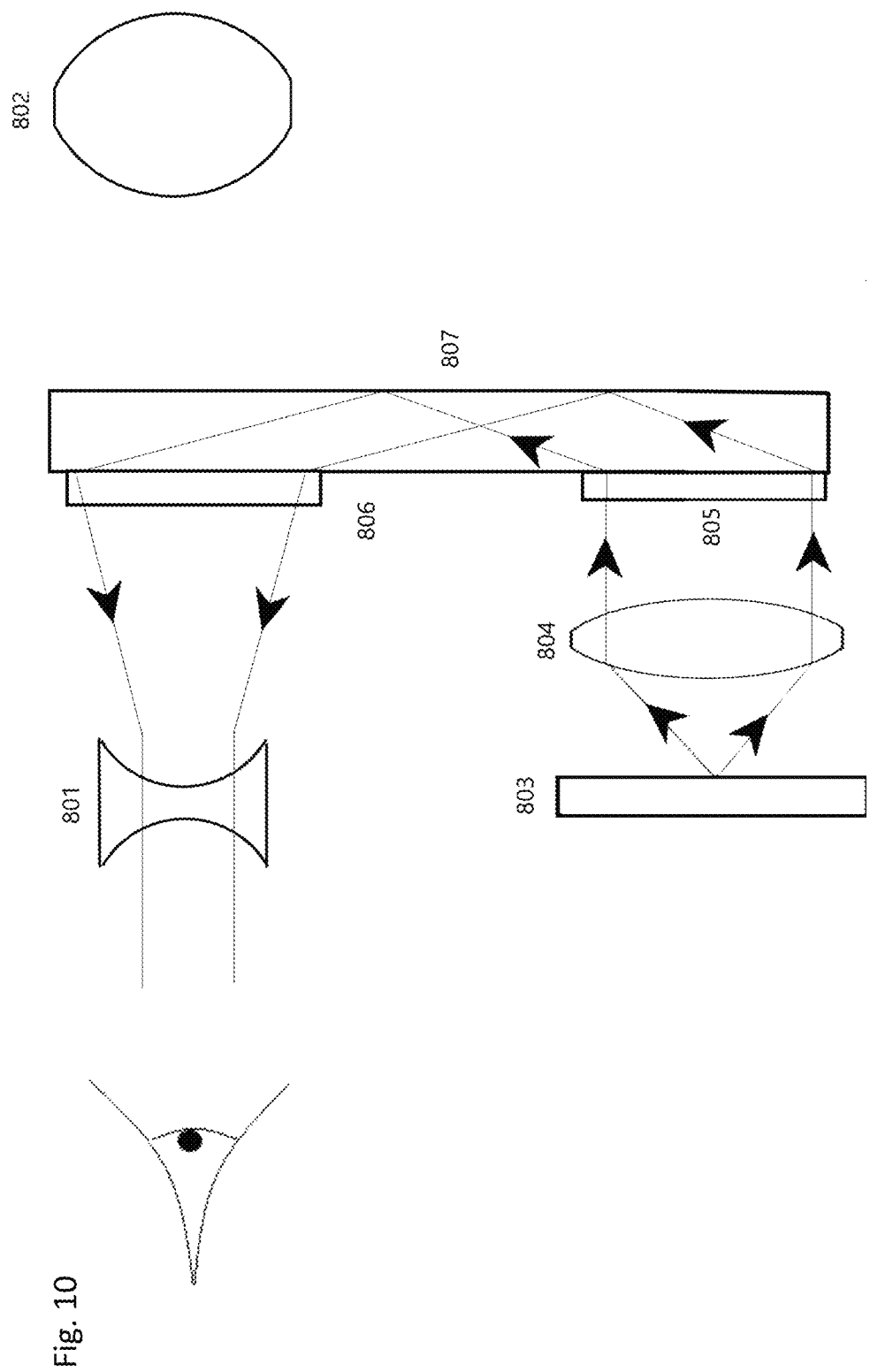
FIG. 10 depicts a schematic configuration for applying a holographic reticle to a Galilean magnification system in accordance with a second embodiment of the disclosure.

Some variations on these basic embodiments are possible, for example using a holographic transparent waveguide to transfer the light. Referring next to FIG. 10, there is depicted a schematic configuration for applying a holographic reticle to a Galilean magnification system in accordance with a second embodiment. This configuration comprises: an eyepiece lens 801; an objective lens 802; an object 803; a lens 804; a holographic incoupler 805; a holographic outcoupler 806; and a waveguide 807. The waveguide 807 is incorporated within the Galilean telescope formed by the eyepiece lens 801 and the objective lens 802. Light from the object 803 is collimated by the lens 804 and coupled into the waveguide 807 (a glass substrate) by the holographic incoupler 805, which diffracts the light at an angle greater than the critical angle for Total Internal Reflection (TIR). The incoupled light propagates along the waveguide 807 and is then outcoupled by holographic outcoupler 806. Typically, an outcoupler would be configured to provide an image at infinity, but here, the holographic outcoupler 806 is rather configured to provide a converging output which is compensated by the eyepiece lens 801 and set at the designed virtual image distance. This virtual image is then overlaid with a magnified view of the real world from the Galilean telescope. In other words, the outcoupler 806 adds optical power that, when combined with the power of the eyepiece lens 801, sets the virtual image distance to the same as the working distance of the Galilean magnification system (for example, a telescopic sight). The outcoupler 806 can be made using one collimated beam and one with optical power, such that the fringe spacing will vary across the hologram. The waveguide 807 is placed inside the Galilean magnification system, which also serves to protect the waveguide.

A Galilean telescope can be used in reverse (the objective lens becomes the eyepiece lens and vice versa). This results in a de-magnified, wide FOV view of the real world. This is used in (for example) camera viewfinders. It may be possible to use a holographic reticle in this reverse telescope to add information to the viewfinder (for example, to help centre the camera view on the area of interest, with a virtual image or reticle that is in focus with the real world). The holographic reticle could be designed in reverse as well, so the holographic reticle would be made with a diverging rather than converging beam to allow for compensation when viewed through the positive eyepiece.

An example of this is now considered with reference to FIG. 11, in which there is depicted a schematic configuration for applying a holographic reticle to a Galilean magnification system in accordance with a third embodiment. This configuration comprises: an objective lens 901; an eyepiece lens 902; an object 903; a lens 904; a holographic incoupler 905; a holographic outcoupler 906; and a waveguide 907. The operation of this configuration is very similar to that discussed above, with reference to FIG. 10. This configuration allows a reverse Galilean telescope (in which user views through the "reverse" side of the telescope), for use in a camera viewfinder or similar, comprising the objective lens 901 and the eyepiece lens 902. The waveguide 907 is configured and acts as discussed with regard to the waveguide 807 in FIG. 10, but the holographic outcoupler 906 diverges the outcoupled light, which is then compensated for by the (positive) eyepiece lens 902, to provide a virtual image at the correct distance, overlaid on a de-magnified wide-FOV view of the real world, due to incorporation within the reverse Galilean telescope.

Referring again to the general senses discussed above, the reticle device optionally comprises: a waveguide arrangement, configured to receive light from off the axis and output the received light towards the eyepiece lens. For example, the waveguide arrangement can comprise: a waveguide for transmitting in-coupled light; an incoupler, arranged to receive the light from off the axis and couple the received light into the waveguide such that the waveguide transmits the in-coupled light; and an outcoupler, arranged to outcouple the transmitted light towards the eyepiece lens. The incoupler advantageously comprises a linear grating and/or the outcoupler advantageously comprises a linear grating. Optionally, the outcoupler comprises a grating with optical power, in particular having the same fringe spacing (for instance, in lines/mm) as the incoupler (particularly, at the centre of the outcoupler).

Preferably, the waveguide arrangement further comprises a collimating lens, arranged to receive light, collimate the received light as output light and direct the output light towards the incoupler.

Figure 5:
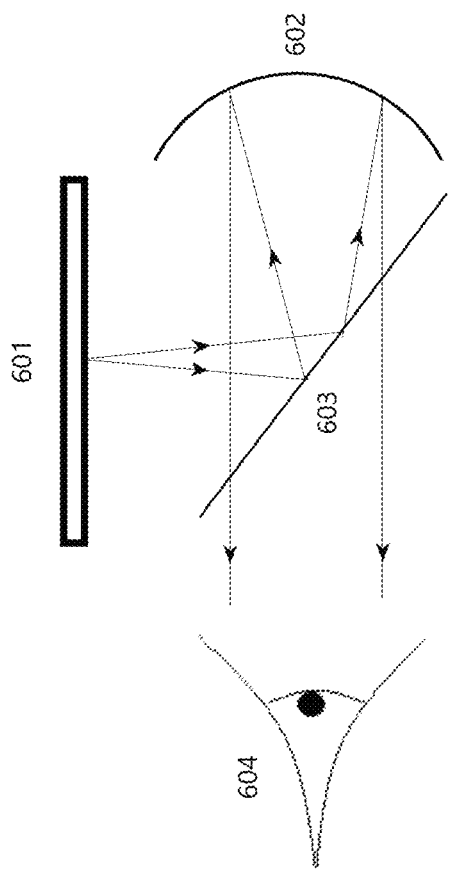
FIG. 5 schematically illustrates a known "birdbath" technique for reticle display.

As discussed above, other types of reticles can be set within a Galilean telescope using refractive optics to allow for a compensated focal plane. In certain embodiments, the well-known refractive optics approach termed "birdbath" optics (as discussed above with reference to FIG. 5) can be adapted for incorporation in a Galilean magnification device. Compared with a standard "birdbath" optics design, a spherical mirror with a radius of curvature is adjusted to compensate for the eyepiece lens and to set the virtual image distance at a suitable working distance. Alternatively, the microdisplay can be moved further away from the mirror, for example, to twice the distance further away which will mean the mirror combiner creates the image of the microdisplay as a real image close to the user and this real image is then viewed as a virtual image at the designed far distance when viewed through the negative eyepiece.

Referring now to FIG. 12, there is schematically illustrated a "birdbath" technique for reticle display in accordance with a yet further embodiment or aspect of the disclosure. This reticle device configuration comprises: a reticle object 701, for instance a dynamic digital microdisplay reticle or backlit reticle; a partially transparent concave mirror 702 (for instance, part-silvered or a dichroic coating that preferentially reflects only some wavelengths of light); and a partially transparent beam splitter 703. In this adjusted configuration, the reticle object 701 is placed at a distance greater than the focal length of the mirror 702, therefore creating a real image 704. This reticle device configuration is then placed within a Galilean telescope (between the eyepiece lens and objective lens, not shown), such that image 704 appears at the desired virtual image distance and this light is then collimated by the eyepiece lens.

The normal disadvantages of a "birdbath" approach are that it is bulky, inefficient, reduces real world transmission, the spherical aberration from the mirror creates parallax error across the eyebox, and it creates double images (reflections from the back surfaces of elements, which are especially noticeable in a high resolution reticle). The birdbath design can have various alternative embodiments to overcome normal disadvantages, such as using a lens rather than a mirror, or the mirror can be positioned out of the user's eye-line (that is positioning the mirror 702 axially below the beam splitter 703).

However, the "birdbath" design could also be made using a holographic optical element (HOE), whereby the beam splitter could be a holographic beam splitter and the partially transparent mirror could be a holographic mirror (or lens). The holographic mirror would have a compensating optical power as described previously. This has advantages over a refractive or reflective "birdbath" solution in terms of higher real world see through, higher reticle light utilisation efficiency, and flat, thin, lightweight elements. The image could be static or dynamic. The on-axis nature of the design means that LED illumination could be used.

The mirror equation can be used to calculate the distance of the image from the mirror, relative to the object distance and the focal length of the mirror. The mirror equation is $1/v+1/u=1/f$, where u is the distance from the object to the mirror, v is the distance from the image to the mirror, and f is the focal length of the mirror (note the radius of curvature of the mirror, $R=2f$). The magnification of the image is given by v/u. It should be noted that this mirror equation is only accurate for the paraxial situation, that is for rays near the optical axis.

For a concave mirror, if the object distance is less than the focal length of the mirror, then the image is upright, virtual and magnified. Typically, this is the case for an augmented reality "birdbath" design, where the microdisplay (object) is placed slightly closer than the focal length of the mirror, to provide a magnified image of the microdisplay overlaid on the real world at a far distance (at least 1 m). If the object is further away from the mirror than the focal length, then the image is real and inverted. This latter situation applies in this disclosure where the birdbath system is designed to create a real image, which is then compensated for by the negative eyepiece and set at a far distance as a virtual image when viewed through the telescope and overlaid on a magnified view of the real world.

Figure 13:
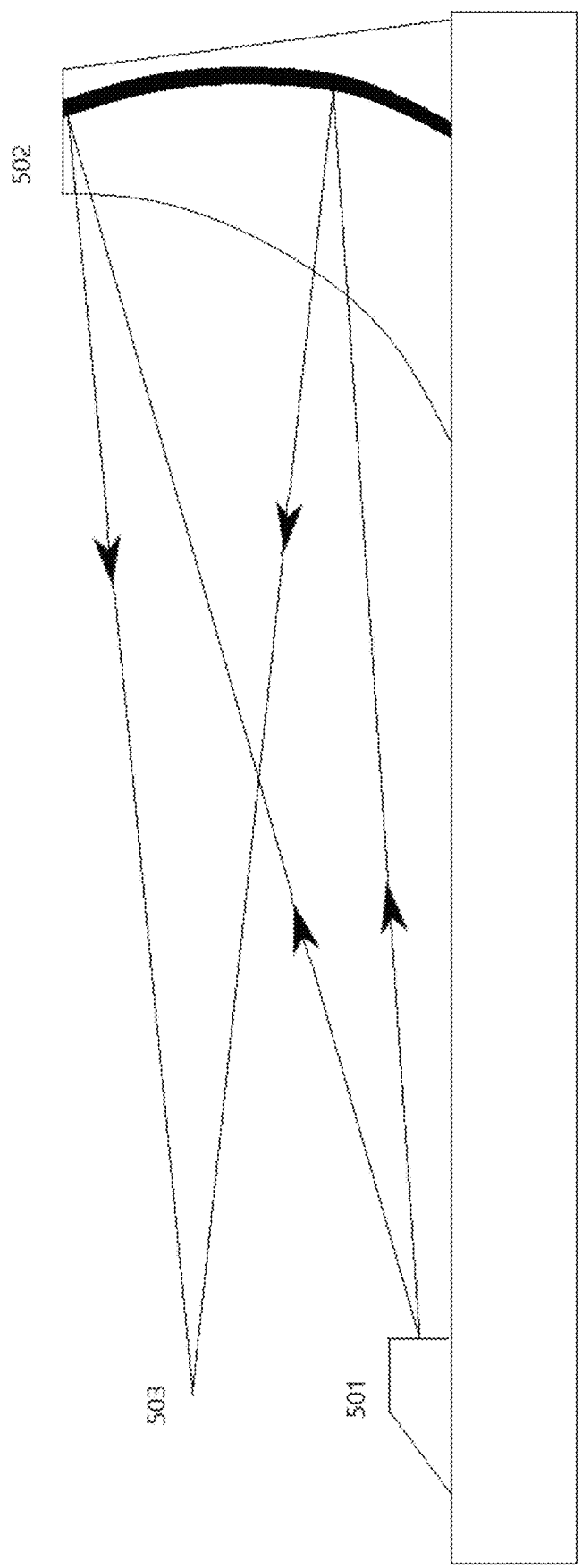
FIG. 13 shows a schematic view of a red dot reticle in accordance with a further aspect of the disclosure.

A similar adaptation can be made for a standard refractive red dot (or reflex) sight, as described previously. Referring to FIG. 13, there is shown a schematic view of a red dot reticle in accordance with a further embodiment or aspect of the disclosure. This comprises: a point source LED 501, which typically emits light through a pinhole; and an off-axis partially-transparent ellipsoidal mirror 502. The off-axis partially-transparent ellipsoidal mirror 502 allows light through from the real world (in other words, through the objective lens). As an off-axis mirror, it accepts light incident from an angle and reflects it back on axis. In this way, the light source does not block line of sight between the objective lens and the eyepiece lens. Moreover, this reduces stray light and specular reflections from other surfaces. As long as the off-axis angle is greater than about 10 degrees, unwanted reflections (for example, from glass surfaces of holograms or similar) do not go into the vision of the user.

Figure 4:
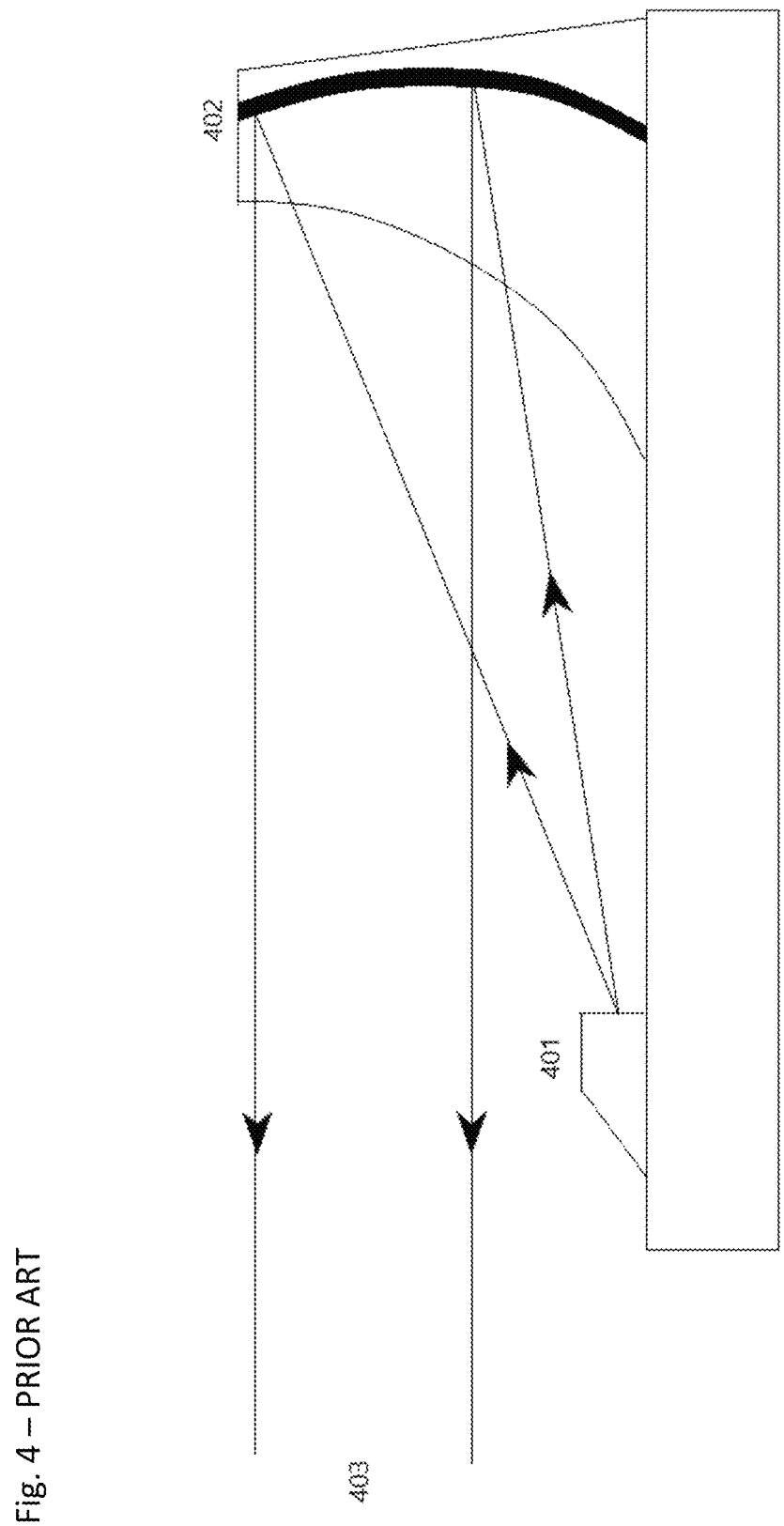
FIG. 4 shows a schematic view of a known typical red dot reticle (reflex sight).

A distance between the point source 501 and the mirror 502 is increased (compared with that of designs in accordance with FIG. 4), past the focal length of the mirror 502. The mirror 502 is configured to provide a real image 503 of the dot. This can then be placed within a Galilean telescope (between the eyepiece lens and objective lens, not shown), such that image 503 appears at the desired virtual image distance and this light is then collimated by the eyepiece lens.

In this way, the red dot sight is redesigned with an off axis finite-finite conjugate ellipsoidal mirror and a suitable object distance to create a real image of the red dot. The object is further back than the focal length of the mirror, such that the image becomes a real image at a near distance, and can then be set by the negative eyepiece lens to the desired far virtual focal distance. The real image is then set to the designed far virtual image distance, once placed within a Galilean telescope and viewed through the negative eyepiece lens. A disadvantage of the reflex sight is that some light is transmitted away from the user and therefore can be viewed by targets in the real world.

In a further general sense (which can be combined with other aspects and/or features disclosed herein), there is an optical system, comprising: a Galilean magnification device; and a reticle device, comprising a reticle light source. The Galilean magnification device comprises an objective lens and an eyepiece lens arranged along an axis, one of the objective lens and the eyepiece lens being a positive lens and the other being a negative lens. The objective lens and the eyepiece lens define an image working distance (and/or focal plane), as discussed above.

The reticle device, which is advantageously within the Galilean magnification device, preferably comprises a partially transparent concave mirror, arranged to receive light from the reticle light source and reflect the received light towards the eyepiece lens. The mirror is further configured to apply an optical power to the reflected light such that the reflected light is set at the image working distance (collimated or set at the same focal plane as the light from the objective lens) by the eyepiece lens. The reticle light source is optionally a dynamic light source, for example an image display or microdisplay.

In one embodiment (for example, for a reflex sight), the concave mirror is an ellipsoidal mirror. A distance between the reticle light source and the concave mirror is advantageously greater than a focal length of the concave mirror (optionally equal to the focal length). Preferably, the ellipsoidal mirror is partially transparent and/or positioned off the axis.

In another embodiment (for example in the form of a "birdbath" configuration), the reticle device comprises a beam splitter, positioned on the axis and configured to receive light from the reticle light source and direct the received light to the concave mirror. Advantageously, the beam splitter is further configured to be transparent to the reflected light from the concave mirror.

Although specific embodiments have now been described, the skilled person will appreciate that various modifications and alternations are possible. For instance, although telescopes have been discussed above, a reticle can also be used for other purposes, for example a gun sight reticle with wind and deflection adjustment, estimating sizes of distant objects via a calibrated reticle scale (rangefinder, theodolite, astronomical telescope or similar) or an alignment/measurement tool for a short working distance magnification application (for instance, surgical loupe, jewellery inspection). Other camera systems, for example afocal attachments (to change a focal length of a lens system) and telephoto lenses which do not have intermediate images could also be used with a pre-compensated holographic reticle placed within the lens system as described in this document.

A variation on the configuration as shown in FIGS. 6 and 9 (and discussed above) is, in the recording process, to replace the backlit diffuse reticle mask 1209 with a point source. This would then record a HOE lens at the position of the holographic material 1202 with compensated distance as described above. Then in the replay process, the replay point source 1301 is replaced with a laser-backlit, diffuse, masked reticle or dot. The HOE lens (now in the position of the hologram 1302) would then focus the image of the reticle and when viewed through the eyepiece lens an image of the correctly focused reticle would be seen. This concept is effectively the same as the concept described previously, but involves swapping around the position of the diffuse reticle from recording to replay. Typically, this latter variation is not done as it is harder to align and control aberrations in a practical device, unless the diffuse image is very small. It would however allow for a dynamic reticle as that could be projected on a diffuser.

In the general sense of an optical system (or method of manufacturing or operating) discussed above, the reticle device comprises: a backlit or light source reticle positioned off the axis. Optionally, the reticle device further comprises a holographic optical element lens arranged to receive light from the backlit or light source reticle, diffract the received light and direct the diffracted light towards the eyepiece lens.

In the general sense of a method (or system) for recording a hologram, the step of providing the coherent object light can be considered to comprise directing a coherent point source to the lens arrangement, such that a holographic optical element lens is recorded on the holographic material.

A typical approach for a reticle is creating a static unchanging image. Another, less used approach is to create a dynamic changing image from a display (so the reticle can be updated in real time). In the static situation, as shown in FIG. 9, an image is recorded in the hologram and replayed. In the dynamic situation, the hologram is recorded as in FIG. 9 but just with a point of light rather than a diffuse reticle. The hologram then acts as an off-axis lens. An image is then placed at the focal point of the holographic lens and that is seen as the reticle, so it could be a real reticle mask, or a dynamic image projected on a diffuser, a microdisplay or similar. One difference is that with the static situation a laser (or other narrow band light source) is desirably used for best results, as the outcoupler with the image in has optical power. For the dynamic version, the incoupler and outcoupler are typically identical and symmetric and may thus compensate for the spectral bandwidth, allowing a broadband light source to be used, for instance an LED light source (compared to a narrow band laser source).

A dynamic reticle would allow for a reticle that could be updated in real time, for example to display range-finding information, different reticle designs, elevation, wind adjustments, target direction, threat indicator, etc. As explained above, this could be done in a compact fashion with a birdbath and microdisplay (see FIG. 12 and its associated discussion above) or a thin transparent holographic waveguide combined with a dynamic microdisplay. This dynamic microdisplay typically comprises: a microdisplay; a collimating lens; an incoupler; and an outcoupler. An image is incoupled to the holographic waveguide and then outcoupled to the eye, overlaid on a magnified real world view by a telescope. This sets the virtual image at infinity over a relatively large eyebox. This device is placed outside the telescope, in between the eye and the telescope, which (if thin enough) would not significantly affect the eye relief. However, this will only have zero parallax if the telescope working distance is infinity which it is not typically for a pistol/rifle sight. Also, this is bulky and fragile.

Instead of such an existing typical waveguide solution with a dynamic microdisplay, according to the present disclosure, a static reticle image can be recorded into the holographic outcoupler of the waveguide, with optical power to set the reticle as a real image, such that when placed within a Galilean telescope it will be viewed at the correct virtual distance. A laser or LED can then be used with (or without) a collimating lens simply to illuminate the holographic incoupler and this light will propagate along the waveguide to illuminate the outcoupler.

In the general senses discussed previously, the reticle device can be considered to comprise a waveguide arrangement, comprising: a waveguide arranged to transmit in-coupled light; an incoupler, arranged to receive light from off the axis and couple the received light into the waveguide such that the waveguide transmits the in-coupled light; and a holographic outcoupler, configured to receive the transmitted light from the waveguide and to output the received light towards the eyepiece lens, a static reticle image being recorded into the holographic outcoupler. In particular, the holographic outcoupler can be configured with an optical power to converge or diverge the outcoupled light.

There are other complications with a waveguide solution, such as: a limited eyebox (especially in the powered outcoupler situation); the illumination optics can be bulky; it can be complicated to make; and it can be fragile. However, incorporating a waveguide into a telescope makes the whole device (reticle and magnifier) less bulky and helps to protect the waveguide. It also allows the image to be set the correct focal plane, for example at 20 m, whereas a normal waveguide is set at infinity.

As well as refractive telescopes, reflective telescopes can be fabricated, which do not suffer from chromatic aberration but do typically block part of the real world view. One typical reflective telescope design is the Cassegrain design, which does not have an intermediate image and therefore a physical reticle cannot be used. A Cassegrain telescope is effectively a Galilean telescope but made with mirrors rather lenses. The same concept as described above can be applied to place a pre-compensated holographic reticle within a Cassegrain reflective telescopic system.

Zoom telescopes can be fabricated to provide variable magnification, which typically requires at least three lenses (so at least one extra lens), two of which can move relative to each other. A Keplerian zoom telescope has two intermediate image planes for the reticle, and the reticle can be placed at two positions within the telescope, at the first focal plane or the second focal plane. At the first focal plane, the apparent size (magnification) of the reticle will also change as the zoom is altered, which is not desired. At the second focal plane, this change of reticle size does not occur, but if the reticle is used for range finding applications, the size of the reticle lines (used to determine distance in the real world)

can vary relative to the real world size as the zoom (magnification) is altered. Hence, the reticle can be reticle as described herein (zoom elements are behind a hologram, with the objective lens and one other lens moveable), but the zoom telescopic sight could change the magnification of the real world (say from 1.5 to 3×) and the reticle would stay the same size. A zoom Galilean telescope with a holographic reticle will have the same challenges as in the second focal plane of a Keplerian telescope. A dynamic reticle (rather than static) could be used to adjust the reticle line pattern size as a function of zoom.

Many modifications and other embodiments of the disclosure set forth herein will come to mind to the one skilled in the art to which the disclosure pertains having the benefit of the teachings presented in the foregoing description and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical system, comprising:
   a Galilean magnification device comprising an objective lens and an eyepiece lens arranged along an axis;
   wherein one of the objective lens and the eyepiece lens is a positive lens and the other is a negative lens, thereby defining an image working distance;
   a reticle device in the Galilean magnification device, the reticle device comprising a holographic reticle element recorded in a holographic material as an interference pattern;
   wherein the reticle device is configured to receive light to illuminate the holographic reticle element from off the axis and to diffract the received light through the holographic reticle element and onto the axis to replay an image of the holographic reticle element, so that light from the holographic reticle element is set at the image working distance by the eyepiece lens to allow the replayed image of the holographic reticle element to be viewed; and
   wherein the holographic element further comprises a hologram or holographic optical element positioned along the axis between the objective lens and the eyepiece lens.

2. The optical system of claim 1, wherein the optical system is configured so that light from the objective lens is set at the image working distance by the eyepiece lens.

3. The optical system of claim 1, wherein the reticle device further comprises a replay light source configured to illuminate the hologram.

4. The optical system of claim 1, wherein the reticle device comprises:
   a backlit or light source reticle positioned off the axis; and
   a holographic optical element lens arranged to receive light from the backlit or light source reticle, and direct the diffracted light towards the eyepiece lens.

5. The optical system of any one of claim 1, wherein the Galilean magnification device is a reverse Galilean telescope so that the objective lens is a negative lens and the eyepiece lens is a positive lens, and wherein the reticle device is configured so that light diverges towards the eyepiece lens.

6. The optical system of claim 1, wherein the holographic reticle element is recorded in the holographic material with zero parallax.

7. The optical system of claim 1, wherein the holographic reticle element is viewed with zero parallax.

* * * * *